US012570004B2

(12) United States Patent
Chiu

(10) Patent No.: US 12,570,004 B2
(45) Date of Patent: Mar. 10, 2026

(54) SYSTEM FOR COMPANION ROBOT WITH THREE-DIMENSIONAL (3D) DISPLAY AND METHOD THEREOF

(71) Applicants: SQ Technology (Shanghai) Corporation, Shanghai (CN); Inventec Corporation, Taipei City (TW)

(72) Inventor: Chuan-Cheng Chiu, Taipei City (TW)

(73) Assignees: SQ Technology (Shanghai) Corporation, Shanghai (CN); Inventec Corporation, Taipei City (TW)

( * ) Notice: Subject to any disclaimer, the term of this patent is extended or adjusted under 35 U.S.C. 154(b) by 209 days.

(21) Appl. No.: 18/540,320

(22) Filed: Dec. 14, 2023

(65) Prior Publication Data

US 2025/0091221 A1     Mar. 20, 2025

(30) Foreign Application Priority Data

Sep. 15, 2023    (CN) .......................... 202311196428.3

(51) Int. Cl.
B25J 11/00          (2006.01)
B25J 9/16          (2006.01)
(52) U.S. Cl.
CPC ............. *B25J 11/001* (2013.01); *B25J 9/163* (2013.01); *B25J 9/1697* (2013.01)
(58) Field of Classification Search
CPC ........ B25J 11/001; B25J 9/163; B25J 9/1697; B25J 11/0005; B25J 11/009; B25J 11/0015
See application file for complete search history.

(56) References Cited

U.S. PATENT DOCUMENTS

| | | | |
|---|---|---|---|
| 2011/0216177 A1* | 9/2011 | Chae | H04N 13/30 |
| | | | 348/57 |
| 2016/0231645 A1* | 8/2016 | Mahoor | G03B 21/10 |
| 2019/0105783 A1* | 4/2019 | Al Moubayed | B25J 11/0015 |
| 2022/0227003 A1* | 7/2022 | Mahoor | G06F 3/167 |

(Continued)

OTHER PUBLICATIONS

Simkins, Steve "How to Create Generative Art NFTs" Jul. 6, 2023 https://medium.com/pinata/how-to-create-generative-art-nfts-1060c56bddc8 (Year: 2023).*

*Primary Examiner* — Abby Lin
*Assistant Examiner* — Danielle M Jackson
(74) *Attorney, Agent, or Firm* — David R. Stevens; Stevens Law Group

(57)          ABSTRACT

A system for companion robot with 3D display device and a method are disclosed. In the system, a companion robot continuously senses a user behavior status and an input speech, converts the input speech to a text, transmits the text and the user behavior status to finite state machines of a server-end host to perform parsing and transition, so that the server-end host generates a chat message having an emotion label, transmits the chat message to an AI device, receives and stores the companion conversation message to a companion conversation list; the companion robot selects companion conversation message from the companion conversation list as an output message, and convert the output message to speech which is broadcasted by a speaker; while broadcasting the output message, the companion robot continuously obtains image data from a multi-source image and outputs the image data to a 3D display device for displaying.

10 Claims, 8 Drawing Sheets

(56)          References Cited

U.S. PATENT DOCUMENTS

2024/0412030 A1* 12/2024 Guinn .................... G06N 3/045
2024/0428619 A1* 12/2024 Zass ..................... G06V 40/174
2025/0005359 A1*  1/2025 Yang ........................ G06N 3/08

* cited by examiner

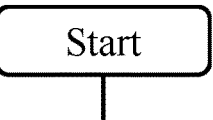

Start

Connecting a server-end host to an artificial intelligence device and a companion robot, wherein the server-end host comprises a finite state machine controller, a non-transitory computer-readable storage medium, and a hardware processor, the artificial intelligence device comprises an application programming interface, the companion robot comprises at least one sensor, a speaker, a storage device, a microcontroller, and a 3D display device, and the 3D display device comprises pixel lines

210

Storing a multi-source image and control instructions in the storage device, wherein the multi-source image comprises frames, M pieces of image data which have different capture angles and are time-synchronized, each of the frames comprises M pixel blocks, each of the M pixel blocks comprises an image screen, and in each of the frames, the image screens in the pixel blocks arranged at the same position are image screens of the same piece of image data at different time points, wherein M is a positive integer

220

Using the at least one sensor of the companion robot to continuously sense at least one of physiological statuses, facial expressions and body movements of a user to generate a user behavior status, sensing an input speech and converting the input speech to generate an input message through a speech-to-text technology, and transmitting the user behavior status and the input message to the server-end host

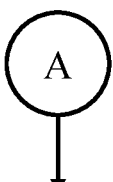

Inputting the user behavior status and the input message from the companion robot to the finite state machine controller, which integrates multiple finite state machines, to perform a parsing process and transitions of states of the finite state machines to generate a chat message having an emotion label, and transmitting the chat message to the artificial intelligence device through the application programming interface, by the server-end host | 240

Inputting the chat message to the large language model to generate at least one companion conversation message, and transmitting the at least one the companion conversation message to the server-end host through the application programming interface, by the artificial intelligence device | 250

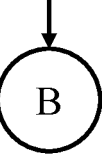

FIG. 2B

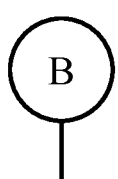

B

Receiving the companion conversation message from the artificial intelligence device and storing the received companion conversation message to a companion conversation list, after the companion conversation list is stored completely, permitting the companion robot to automatically select and load at least one of the companion conversation messages from the companion conversation list as the output message, by the server-end host, and converting the loaded output message to an output speech through a text-to-speech technology and broadcasting the output speech through the speaker, by the microcontroller          260

While the output speech is broadcasted, continuously reading the image screens of the pixel blocks in each of the frames to obtain the M pieces of image data from the multi-source image stored in the storage device, and outputting the image screens to the 3D display device, by the companion robot          270

Displaying the M pieces of image data, by the 3D display device, wherein the pixel lines displaying different pieces of image data have different viewing angles, and a relative position of a viewing angle to display one of the pieces of image data is the same as a relative position of a capturing angle of the one of the pieces of image data          280

End

| | | | | |
|---|---|---|---|---|
| <u>511</u> | <u>512</u> | <u>513</u> | <u>514</u> | <u>515</u> |
| <u>521</u> | <u>522</u> | <u>523</u> | <u>524</u> | <u>525</u> |
| | | | | |
| | | | | |
| | | | | |

SYSTEM FOR COMPANION ROBOT WITH THREE-DIMENSIONAL (3D) DISPLAY AND METHOD THEREOF

CROSS-REFERENCE TO RELATED APPLICATION

This application claims the benefit of Chinese Application Serial No. 202311196428.3, filed Sep. 15, 2023, which is hereby incorporated herein by reference in its entirety.

BACKGROUND OF THE INVENTION

1. Field of the Invention

The present invention relates to a companion robot and a method thereof, and more particularly to a system for companion robot with three-dimensional (3D) display and a method thereof.

2. Description of the Related Art

In recent years, with the popularity and vigorous development of large language model, various related applications have sprung up. Among these applications, a companion robot combined with a large language model has attracted the most attention.

Generally speaking, a conventional large language model can understand and generate natural language texts, but it is still unable to have real perception and understanding, lacks the ability to judge the real world, and is incapable of emotions. That is to say, currently a conventional companion robot combined with a large language model can only answer a user's questions, but lack the interaction and customization like the companionship of relatives, so it has the problem of poor companionship effect.

Therefore, some manufacturers develop a solution in which a companion robot is integrated with a display device to have a function of playing images or videos of relatives to have a function of playing images or videos of relatives to increase the companionship effect. However, simply playing images or videos of relatives is very limited in improving the companionship effect, and it is difficult for users to feel realistic companionship. Therefore, the above-mentioned method is still unable to effectively solve the problem of poor companionship effect.

According to above-mentioned contents, what is needed is to develop an improved solution to solve the conventional problem of poor companion effect.

SUMMARY OF THE INVENTION

An objective of the present invention is to disclose a system for companion robot with three-dimensional (3D) display and a method thereof, to solve the conventional problem.

In order to achieve the objective, the present invention discloses a system for companion robot with three-dimensional (3D) display, and the system includes an artificial intelligence device, a companion robot, and server-end host. The artificial intelligence device is configured to receive a chat message having an emotion label through an application programming interface, input the chat message to a large language model, to generate at least one companion conversation message, and transmit the companion conversation message through the application programming interface. The companion robot includes at least one sensor, a speaker, a storage device, a microcontroller, and a 3D display device. The at least one sensor is configured to continuously sense at least one of physiological statuses, facial expressions, and body movements to generate a user behavior status, sense an input speech, generate an input message through a speech-to-text technology, and transmit the user behavior status and the input message corresponding to the user behavior status. The speaker is configured to broadcast an output speech. The storage device is configured to store a multi-source image and control instructions, wherein the multi-source image comprises frames, and M pieces of image data which have different capture angles and are time-synchronized, each of the frames comprises M pixel blocks, each of the pixel blocks includes an image screen, and in each of the frames, the image screens in the pixel blocks arranged at the same position are the image screens of the same piece of image data at different time points, wherein M is a positive integer. The microcontroller is electrically connected to the speaker and the storage device, and configured to execute the control instructions, make the microcontroller receive an output message, convert the output message to the output speech through a text-to-speech technology, continuously read the image screens in the pixel blocks of each of the frames of the multi-source image to obtain the M pieces of image data, and output the M pieces of image data. The 3D display device is electrically connected to the microcontroller, and includes pixel lines configured to display the different pieces of image data, respectively, wherein the pixel lines displaying different pieces of image data have different viewing angles, and a relative position of viewing angle to display one of the pieces of image data is the same as a relative position of a capturing angle of the one of the pieces of image data. The server-end host is connected to the artificial intelligence device and the companion robot, and includes a finite state machine controller, a non-transitory computer-readable storage medium, and a hardware processor. The finite state machine controller is configured to integrate finite state machines. The non-transitory computer-readable storage medium is configured to store computer readable instructions. The hardware processor is electrically connected to the non-transitory computer-readable storage medium and the finite state machine controller, and configured to execute the computer readable instruction, make the server-end host execute: inputting the user behavior status and the corresponding input message which are received from the companion robot, to the finite state machine controller, to perform a parsing process and transition of states of the finite state machines to generate the chat message having the emotion label, transmit the generated chat message to the artificial intelligence device, receive the companion conversation message from the artificial intelligence device, and store the companion conversation message to a companion conversation list; permitting the companion robot to automatically select and load at least one of the companion conversation messages from the companion conversation list as the output message.

In order to achieve the objective, the present invention discloses a method for companion robot with three-dimensional (3D) display, and the method includes steps of: connecting a server-end host to an artificial intelligence device and a companion robot, wherein the server-end host comprises a finite state machine controller, a non-transitory computer-readable storage medium, and a hardware processor, the artificial intelligence device comprises an application programming interface, the companion robot comprises at least one sensor, a speaker, a storage device, a microcontroller, and a 3D display device, and the 3D display device comprises pixel lines; storing a multi-source image and control instructions in the storage device, wherein the multi-source image comprises frames, M pieces of image data which have different capture angles and are time-synchronized, each of the frames comprises M pixel blocks, each of the M pixel blocks comprises an image screen, and in each of the frames, the image screens in the pixel blocks arranged at the same position are image screens of the same piece of image data at different time points, wherein M is a positive integer; using the at least one sensor of the companion robot to continuously sense at least one of physiological statuses, facial expressions and body movements of a user to generate a user behavior status, sensing an input speech and converting the input speech to generate an input message through a speech-to-text technology, and transmitting the user behavior status and the input message to the server-end host; inputting the user behavior status and the input message from the companion robot to the finite state machine controller, which integrates multiple finite state machines, to perform a parsing process and transitions of states of the multiple finite state machines to generate a chat message having an emotion label, and transmitting the chat message to the artificial intelligence device through the application programming interface, by the server-end host; inputting the chat message to a large language model to generate at least one companion conversation message, and transmitting the at least one the companion conversation message to the server-end host through the application programming interface, by the artificial intelligence device; receiving the companion conversation message from the artificial intelligence device and storing the received companion conversation message to a companion conversation list, after the companion conversation list is stored completely, permitting the companion robot to automatically select and load at least one of the companion conversation messages from the companion conversation list as the output message, by the server-end host, and converting the loaded output message to an output speech through a text-to-speech technology and broadcasting the output speech through the speaker, by the microcontroller; while the output speech is broadcasted, continuously reading the image screens of the pixel blocks in each of the frames to obtain the M pieces of image data from the multi-source image stored in the storage device, and outputting the image screens to the 3D display device, by the companion robot; displaying the M pieces of image data, by the 3D display device, wherein the pixel lines displaying different pieces of image data have different viewing angles, and a relative position of a viewing angle to display one of the pieces of image data is the same as a relative position of a capturing angle of the one of the pieces of image data.

According to the system and method of the present invention, the difference between the present invention and the conventional technology is that, the present invention, the companion robot continuously senses the user behavior status and the input speech, converts the input speech to the text, transmits the text and the user behavior status to the finite state machines of the server-end host to perform parsing and transitions, so that the server-end host generates the chat message having the emotion label, transmits the chat message to the artificial intelligence device, receives and stores the companion conversation message to the companion conversation list; the companion robot can select at least one companion conversation message from the companion conversation list as the output message, and convert the output message to speech which is broadcasted by a speaker; while broadcasting the output message, the companion robot continuously obtains M pieces of image data from the multi-source image and outputs the M pieces of image data to the 3D display device for three-dimensional display.

Therefore, the above-mentioned technical solution of the present invention is able to achieve the technical effect of improving a companion effect of the companion robot.

BRIEF DESCRIPTION OF THE DRAWINGS

The structure, operating principle and effects of the present invention will be described in detail by way of various embodiments which are illustrated in the accompanying drawings.

FIGS. 2A to 2C are flowcharts of a method for companion robot with three-dimensional (3D) display, according to the present invention.

DETAILED DESCRIPTION OF THE PREFERRED EMBODIMENTS

Figure 1:
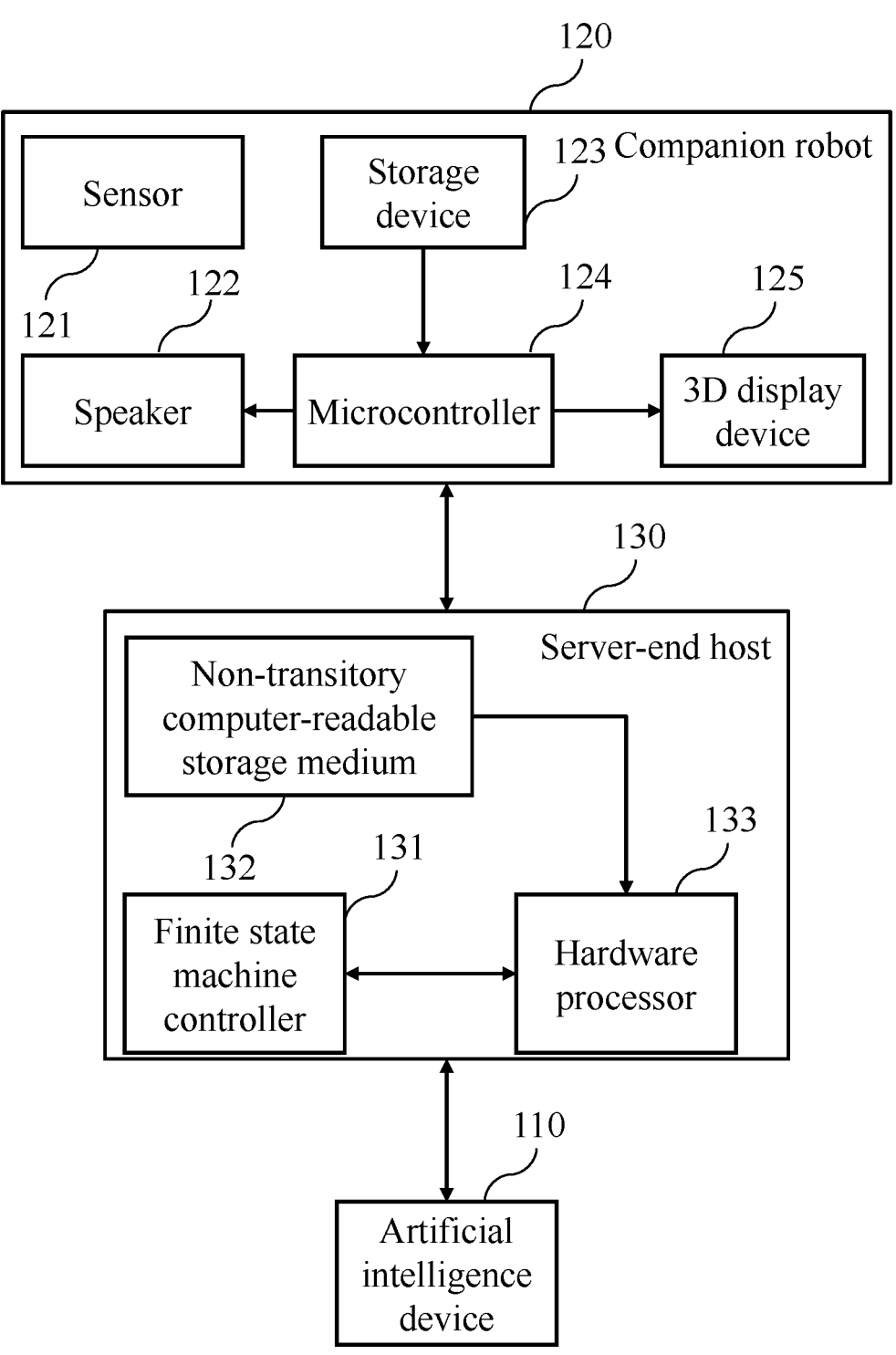
FIG. 1 is a block diagram of a system for companion robot with three-dimensional (3D) display, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Please refer to FIG. 1, which is a block diagram of a system for companion robot with three-dimensional (3D) display, according to the present invention. As shown in FIG. 1, the system includes an artificial intelligence (AI) device 110, a companion robot 120, and a server-end host 130. The artificial intelligence device 110 is configured to receive a chat message having an emotion label through an application programming interface, input the chat message to a large language model to generate companion conversation message, and transmit the companion conversation message through the application programming interface. In actual implementation, the large language model used in the artificial intelligence device 110 can be, for example, a Generative Pre-trained Transformer, (GPT), PaLM, Galactica, LLaMA, LaMDA or the like.

The companion robot 120 includes a sensor 121, a speaker 122, a storage device 123, a microcontroller 124, and a 3D display device 125. The sensor 121 is configured to continuously sense at least one of physiological statuses, facial expressions and body movements to generate a user behavior status, sense an input speech to generate an input message through a speech-to-text technology, and transmit the user behavior status and the corresponding input message to the server-end host 130. In actual implementation, the user behavior status includes a psychological-level part and a physiological-level part, for example, a physiological feature (such as: blood pressure, heartbeat, pulse, blood sugar) can be sensed to determine the user's current psychology and physiological reactions, because these two reactions usually relate to each other and jointly affect the overall behavior of the individual; for example, emotional excitement and depression generate different physiological features. In addition, a user's mood (such as: happiness, anger, sorrow, and joy) can also be determined from the user's facial expression; the user's communication intention can be determined based on the user's body movement, for example, nodding means agreement, shaking head means disagreement, and when the user is sensed to shake hands or pace, it can be determined that the user behavior status is anxious.

The speaker 122 is configured to broadcast the output speech. In actual implementation, the output speech can be processed in the server-end host 130 first to form the output speech having the relative's speech features, and the details of the process will be illustrated in the following paragraphs.

The storage device 123 is configured to store a multi-source image and control instructions. The multi-source image includes frames, and M pieces of image data which have different capture angles and are time-synchronized. Each of the frames includes M pixel blocks, each of the M pixel blocks includes an image screen, and in each of the frames, the image screens stored in the pixel blocks arranged at the same position are the image screens of the same image data at different time points, wherein M is a positive integer.

In actual implementation, the storage device 123 can include for example, a hard disk, an optical disk, a flash memory or the like. In an embodiment, the multi-source image is directly generated by algorithm calculation based on metadata and generative art; the metadata can include uniform resource identifiers corresponding to the pieces of image data. The control instructions are coded by a specific binary form to make the microcontroller 124 interpret and execute the control instructions. These control instructions include various operations (such as mathematic calculation, logic determination and memory access) to control internal operations of the microcontroller 124 and external apparatus connected to the microcontroller 124. In practice, the control instruction of the microcontroller 124 is read, interpreted and executed by the computer, so it is belonged to a computer readable instruction.

The microcontroller 124 is electrically connected to the speaker 122 and the storage device 123, and configured to execute the control instruction to make the microcontroller 124 receive an output message, convert the output message into the output speech through the text-to-speech technology, continuously read the image screens of the pixel blocks in each of the frames from the multi-source image to obtain the M pieces of image data, and output the M pieces of image data to the 3D display device 125. In actual implementation, the M pieces of image data outputted to the 3D display device 125 is presented in a three-dimensional manner.

The 3D display device 125 is electrically connected to the microcontroller 124, the 3D display device 125 includes pixel lines for displaying the different pieces of image data, the pixel lines displaying different pieces of image data have different viewing angles, and a relative position of a viewing angle to display one of the pieces of image data is the same as a relative position of a capturing angle of the one of the pieces of image data. In actual implementation, the 3D display device 125 includes a transmissive display unit and a polarization control unit. The transmissive display unit includes pixel lines, wherein the i pixel lines, which are spaced by $M-1$ pixel lines respectively, are used to display the image screen of the n-th piece of image data outputted from the microcontroller 124, wherein each of i and n is a positive integer and $1 \leq n \leq M$. The polarization control unit includes polarizing components, the polarization control unit controls the polarizing components to form parallax barriers to make the image screen of the n-th image data displayed on the i pixel lines, which are spaced by $M-1$ pixel lines respectively, be viewed at the corresponding viewing angle.

The server-end host 130 is connected to the artificial intelligence device 110 and the companion robot 120, and includes a finite state machine controller 131, a non-transitory computer-readable storage medium 132, and a hardware processor 133. The finite state machine controller 131 integrates finite state machines. In actual implementation, the finite state machines can include a Mealy machine and a Moore-machine.

In actual implementation, the non-transitory computer-readable storage medium 132 is configured to store computer readable instructions; in practice, the computer readable instructions used to perform the operations of the present invention can be assembly language instructions, instruction-set-structure instructions, machine instructions, machine-related Instructions, micro-instructions, firmware instructions, or source codes or object codes written in any combination of one or more programming languages. The programming language includes object-oriented programming languages, such as: Common Lisp, Python, C++, Objective-C, Smalltalk, Delphi, Java, Swift, C#, Perl, Ruby or PUP; the programming language can include regular procedural programming languages, such as C language or similar programming languages.

The hardware processor 133 is electrically connected to the non-transitory computer-readable storage medium 132 and the finite state machine controller 131, and configured to execute the computer readable instructions to make the server-end host 130 execute the following operations: the server-end host 130 inputs the user behavior status and the corresponding input message, which are received from the companion robot 120, to the finite state machine controller 131 to perform parsing and transitions of states of the finite state machines configured to generate the chat message having the emotion label and transmit the chat message to the artificial intelligence device 110, and receive the companion conversation message from the artificial intelligence device 110 and store the companion conversation message to a companion conversation list; the server-end host 130 permits the companion robot 120 to automatically select and load at least one of the companion conversation messages from the companion conversation list as the output message. In actual implementation, above-mentioned execution steps are to apply the special algorithm executed by the hardware processor 133 of the present invention to make the server-end host 130 perform a specific function.

In addition, the server-end host 130 includes a simulation model, and the simulation model is trained with tone training data having relatives' tone features in advance. After the companion conversation list is stored completely, the server-end host 130 loads all companion conversation message from the companion conversation list, and input the loaded companion conversation message to the simulation model to generate the companion conversation message having the relatives' tone features. In addition, the simulation model can be trained with at least one of the image training data having the relatives' motion features and speech training data having relative's speech features in advance; at least one of the M pieces of image data from the storage device 123 and the output speech converted by the microcontroller 124 is loaded and inputted to the simulation model, to generate at least one of the M pieces of image data having the relatives' motion features and the output speech having the relative's speech features.

It is to be particularly noted that, in actual implementation, the present invention can be implemented fully or partly based on hardware, for example, one or more component of the system can be implemented by integrated circuit chip, system on chip (SOC), a complex programmable logic device (CPLD), or a field programmable gate array (FPGA). The non-transitory computer-readable storage medium of the present invention carries computer-readable instructions (or computer program instructions) for causing the processor to implement concepts of the present invention. The non-transitory computer-readable storage medium can be a tangible device that can hold and store instructions for use by an instruction execution device. The computer-readable storage medium can be a tangible apparatus for holding and storing the instructions executable of an instruction executing apparatus. The non-transitory computer-readable storage medium can be, but not limited to electronic storage apparatus, magnetic storage apparatus, optical storage apparatus, electromagnetic storage apparatus, semiconductor storage apparatus, or any appropriate combination thereof. More particularly, the non-transitory computer-readable storage medium can include a hard disk, an RAM memory, a read-only-memory, a flash memory, an optical disk, a floppy disc or any appropriate combination thereof, but this exemplary list is not an exhaustive list. The non-transitory computer-readable storage medium is not interpreted as the instantaneous signal such a radio wave or other freely propagating electromagnetic wave, or electromagnetic wave propagated through waveguide, or other transmission medium (such as optical signal transmitted through fiber cable), or electric signal transmitted through electric wire. Furthermore, the computer readable program instruction can be downloaded from the non-transitory computer-readable storage medium to each calculating/processing apparatus, or downloaded through network, such as internet network, local area network, wide area network and/or wireless network, to external computer equipment or external storage apparatus. The network includes copper transmission cable, fiber transmission, wireless transmission, router, firewall, switch, hub and/or gateway. The network card or network interface of each calculating/processing apparatus can receive the computer readable program instructions from network, and forward the computer readable program instruction to store in computer-readable storage medium of each calculating/processing apparatus.

Please refer to FIGS. 2A to 2C, which are flowcharts of a method for companion robot with three-dimensional (3D) display, according to the present invention. As shown in FIGS. 2A to 2C, the method includes the following steps. In a step 210, a server-end host is connected to an artificial intelligence device and a companion robot, wherein the server-end host includes a finite state machine controller, a non-transitory computer-readable storage medium, and a hardware processor, the artificial intelligence device includes an application programming interface, the companion robot includes at least one sensor, a speaker, a storage device, a microcontroller, and a 3D display device, and the 3D display device comprises pixel lines. In a step 220, a multi-source image and control instructions are stored in the storage device, wherein the multi-source image includes frames, M pieces of image data which have different capture angles and are time-synchronized, each of the frames comprises M pixel blocks, each of the M pixel blocks includes an image screen, and in each of the frames, the image screens in the pixel blocks arranged at the same position are image screens of the same piece of image data at different time points, wherein M is a positive integer. In a step 230, the at least one sensor of the companion robot is used to continuously sense at least one of physiological statuses, facial expressions and body movements of a user to generate a user behavior status, sense an input speech and converts the input speech to generate an input message through a speech-to-text technology, and the user behavior status and the input message are transmitted to the server-end host. In a step 240, the server-end host inputs the user behavior status and the input message from the companion robot to the finite state machine controller, which integrates multiple finite state machines, to perform a parsing process and transitions of states of the multiple finite state machines to generate a chat message having an emotion label, and transmits the chat message to the artificial intelligence device through the application programming interface. In a step 250, the artificial intelligence device inputs the chat message to the large language model to generate at least one companion conversation message, and transmits the at least one the companion conversation message to the server-end host through the application programming interface. In a step 260, the server-end host receives the companion conversation message from the artificial intelligence device and stores the received companion conversation message to a companion conversation list, after the companion conversation list is stored completely, permits the companion robot to automatically select and load at least one of the companion conversation messages from the companion conversation list as the output message, and the microcontroller converts the loaded output message to an output speech through a text-to-speech technology and broadcasts the output speech through the speaker. In a step 270, while the output speech is broadcasted, the companion robot continuously reads the image screens of the pixel blocks in each of the frames to obtain the M pieces of image data from the multi-source image stored in the storage device, and outputs the image screens to the 3D display device. In a step 280, the 3D display device displays the M pieces of image data, wherein the pixel lines displaying different pieces of image data have different viewing angles, and a relative position of a viewing angle to display one of the pieces of image data is the same as a relative position of a capturing angle of the one of the pieces of image data. Through aforementioned steps, the companion robot continuously senses the user behavior status and the input speech, converts the input speech to the text, transmits the text and the user behavior status to the finite state machines of the server-end host to perform parsing and transitions, so that the server-end host generates the chat message having the emotion label, transmits the chat message to the artificial intelligence device, receives and stores the companion conversation message to the companion conversation list; the companion robot can select at least one companion conversation message from the companion conversation list as the output message, and convert the output message to speech which is broadcasted by a speaker; while broadcasting the output message, the companion robot continuously obtains M pieces of image data from the multi-source image and outputs the M pieces of image data to the 3D display device for three-dimensional display.

Figure 3:
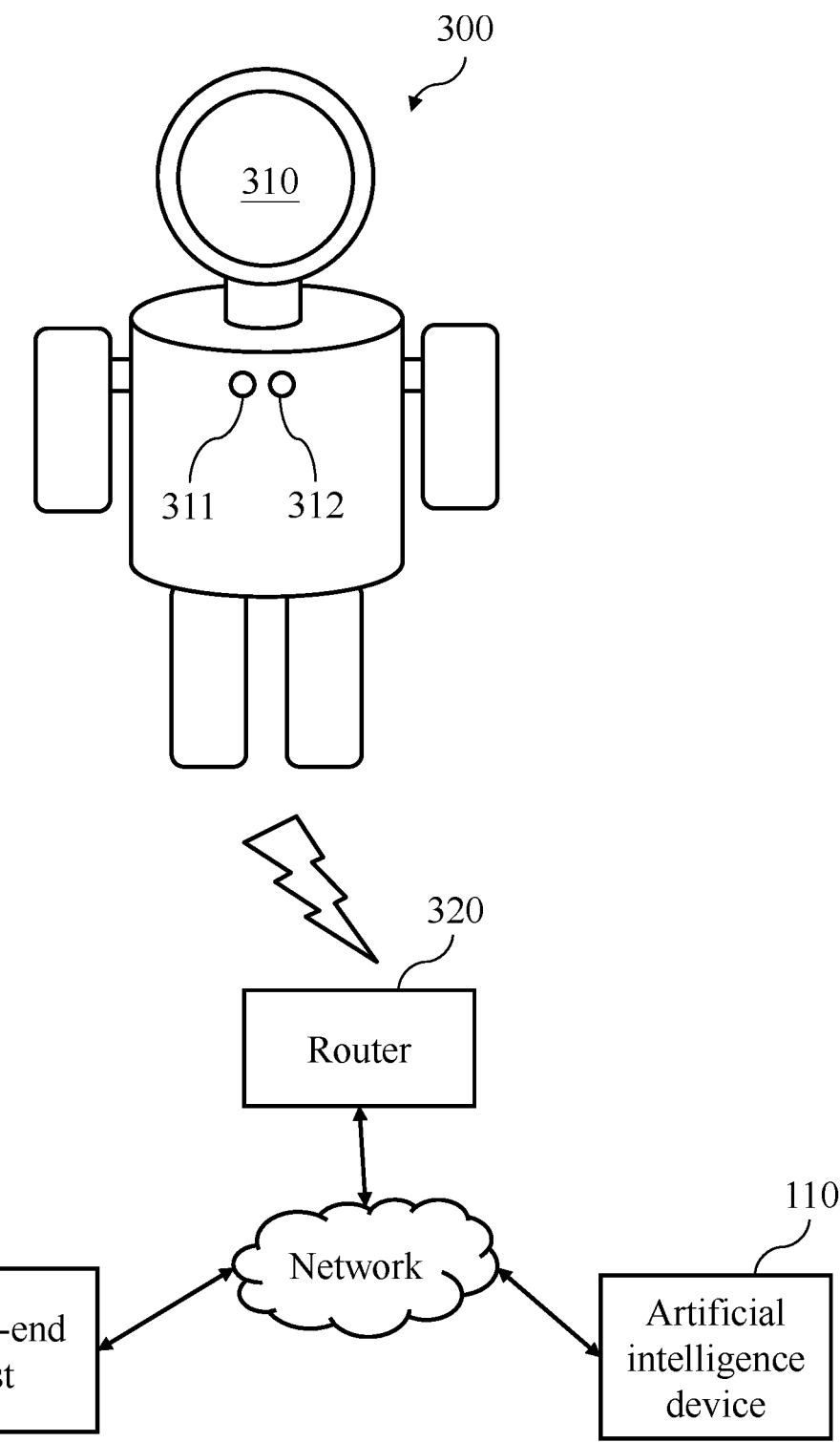
FIG. 3 is a schematic view of using a companion robot to provide a companion service, according to an application of the present invention.

The embodiment of the present invention will be illustrated in the following paragraphs with reference to FIG. 3 to FIG. 5. As shown in FIG. 3, which is a schematic view of using a companion robot to provide a companion service, according to an application of the present invention. The server-end host 130 is connected to the artificial intelligence device 110 and the companion robot 300 through network, the companion robot 300 is connected to network through a router 320 by a wireless manner. In actual implementation, the companion robot 300 uses a sensor 311 to continuously sense a user to generate a user behavior status and sense the user's speech to generate the input speech which is then converted into a text as an input message. In addition, the companion robot 300 broadcasts the output speech, which is received from the server-end host 130, through the speaker 312; the 3D display device 310 is able to display the 2D multi-source image in a three-dimensional manner, and the specific display technology used in this embodiment will be illustrated in detail. Compared to a conventional companion robot, the companion robot 300 applied technology of the present invention can transmit the user behavior status and the corresponding input message to finite state machines of the server-end host 130, for parsing and transitions, for example, the user behavior status and the input message are inputted to an Mealy machine and an Moore machine, which are connected in series, to perform a parsing process, and the states of the an Mealy machines and an Moore machines are changed based on a parsing result, so as to determine the corresponding emotion and embed the determined emotion into the input message to form the chat message having the emotion label. The generated chat message is transmitted to a large language model of the artificial intelligence device 110 through the application programming interface, to generate a companion conversation message and the companion conversation message is transmitted back to the server-end host 130 and stored into the companion conversation list, and at least one companion conversation message can be selected the companion conversation list, so that the companion robot 300 can convert the selected companion conversation message into speech and broadcast the speech. It is particular noted that the server-end host 130 can adjust the companion conversation message in the companion conversation list through the simulation model trained with the tone training data having the relatives' tone features in advance, so as to generate the companion conversation message having the relatives' tone features, and convert the companion conversation message into the speech which is then broadcasted through the speaker 312. While the above-mentioned speech is broadcasted, the 3D display device 310 can display the multi-source image, and the pieces of image data contained in the multi-source image can be images of relatives or virtual characters excessively similar to relatives; when the image data is a virtual character excessively similar to relatives, the simulation model needs to be trained with image training data having relatives' motion features in advance; the companion robot 300 loads the image data from the storage device 123, inputs the image data to the simulation model to generate the image data having the relatives' motion features, and displays through the 3D display device 310. Similarly, the simulation model can be trained with speech training data having relative's speech features in advance, the companion robot 300 can load the output speech converted by the microcontroller 124 and input the output speech to the simulation model to generate the output speech having the relative's speech features, and broadcast the output speech through the speaker 312. In this way, the user can visually and auditorily feel the companionship of relatives at the same time, and avoid feeling abrupt because of the different tone of conversation.

Figure 4A:
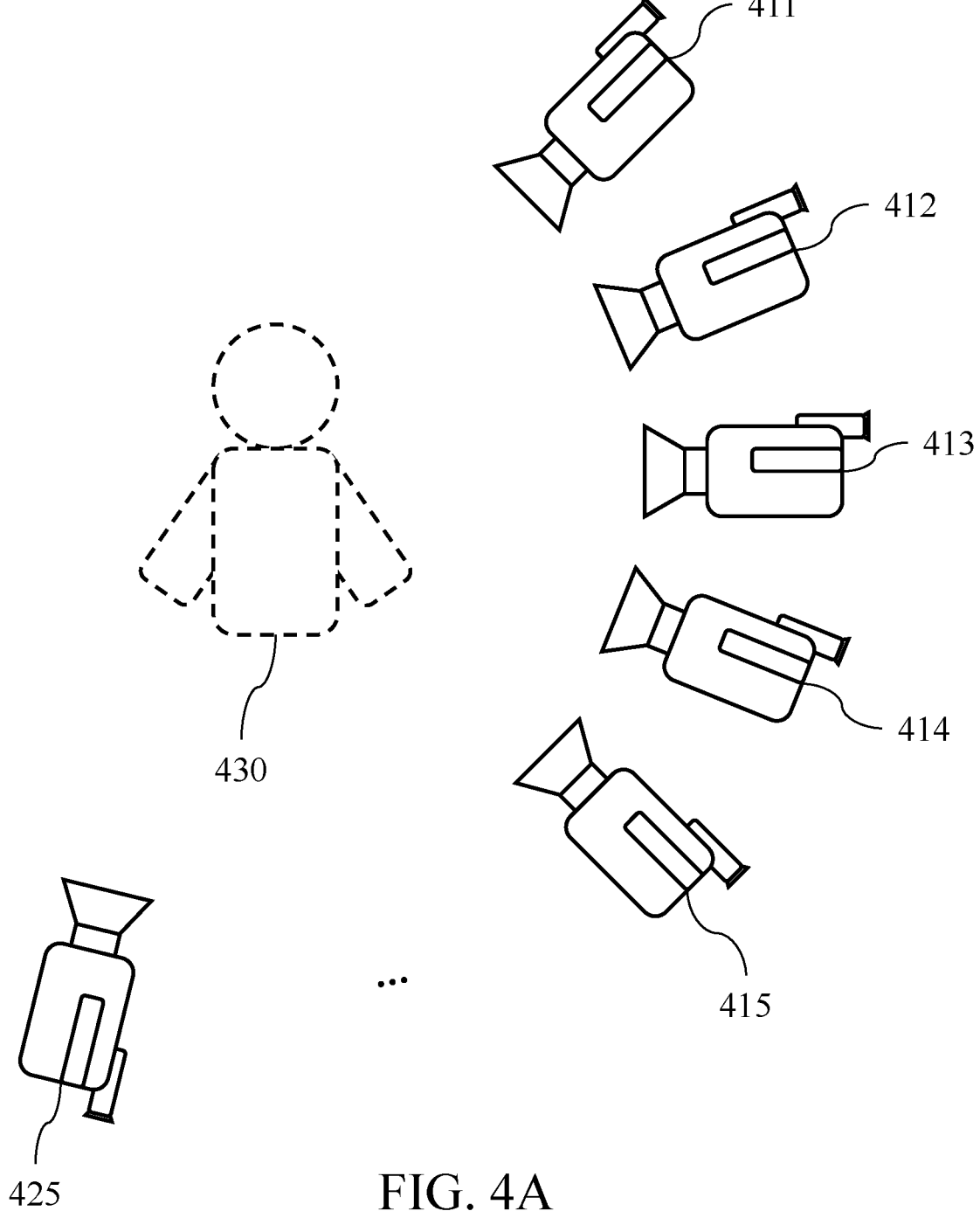
FIG. 4A and FIG. 4B are schematic views of generating a multi-source image and pixel blocks thereof, according to the present invention.
Figure 4B:

Please refer to FIGS. 4A and 4B, which are schematic views of generating a multi-source image and a pixel block, according to the present invention. Please refer to FIG. 4A, the multi-source image can be generated by shooting a shooting target 430 (such as relatives) at the same time to generate synchronous image data by image capture devices 411-425 at different capturing angles, respectively. Generally speaking, the shooting target in the image data of the multi-source image is the same, but the present invention is not limited to above-mentioned example; for example, a part of the image capture devices generating the image data can shoot a specific target, and the other part of the image capture devices generating the image data shoot ambient environment around the specific target. Each of the image capture devices 411-425 can be a camera, but the present invention is not limited to this example; for example, one of the image capture devices 411-425 can be a mobile phone or a digital still camera. In a condition that each frame includes M pixel blocks (in another embodiment, each frame can include more than M image blocks), as shown in FIG. 4B, each frame includes 25 pixel blocks including, for example, a pixel block 511; however, the present invention is not limited to above-mentioned examples. The size and quantity of the pixel blocks contained in each of frames of the multi-source image are the same as each other, and each pixel block of each frame of the multi-source image stores an image screen of the image data captured at a different viewing angle, and the above-mentioned image screen is a frame of the image data. It is particular noted that, the pieces of image data included in the multi-source image are time-synchronized, so the image screens of the pieces of image data in the pixel blocks of the same frame of the multi-source image are time-synchronized; that is, the image screens in the pixel blocks of the same frame in the multi-source image are captured at the same time point. Generally speaking, the image screens of each piece of image data of the multi-source image are located in the frames of the multi-source image at a fixed position; that is to say, the image screens at the pixel blocks arranged at the same position in the frames of the multi-source image are the images of the same piece of image data captured at different time points. For example, when the image screen of the piece of image data captured by the image capture device 411 is arranged at the upper-left-corner pixel block 511 of the frame 500 in the frame of the multi-source image, all of the image screens of the image data captured by the image capture device 411 are fixedly arranged at the upper-left-corner pixel block 511.

It is particularly noted that a position of the image screen of a piece of image data in the pixel block of each frame in the multi-source image can be determined based on the capturing angle of the piece of image data; that is, the position can be determined based on a relative position of the image capture device generating the piece of image data; in another embodiment, the relative positions of the image capture devices are determined based on pieces of device identification data of the image capture devices, for example, the relative positions of the image capture devices can be determined based on an order of values of the device identification data. The device identification data can include but not limited to a network address, a number set by a user, or a serial number. For example, in a condition that there are 25 cameras (that is, image capture devices) used to generate the pieces of image data, the 25 cameras are set as, in the order from left to right, cameras No. 1 to No. 25 of which the pieces of device identification data are 1 to 25 based on the location of the cameras with respect to a shooting target, the image screen of the image data captured by the camera No. 1 can be arranged at the upper-left-corner pixel block 511 of the frame 500 of the multi-source image, the image screen of the image data captured by the camera No. 2 can be arranged at the pixel block 512, and the image screens of the image data captured by the cameras No. 3 to 5 are arranged at the pixel blocks 513-515, the image screens of the image data captured by the cameras No. 6 to 10 are arranges at the pixel blocks 521-525 in second row of the frame 500 in sequential order, and so on; that is, the image screens of the image data captured by the cameras No. 11 to 15 are arranged in the third row of the frame 500 in sequential order, the image screens of the image data captured by the cameras No. 16 to 20 are arranged in the fourth row of the frame 500 in sequential order, and the image screens of the image data captured by the cameras No. 21 to 25 are arranged in the fifth row of the frame 500, in sequential order.

Figure 5:
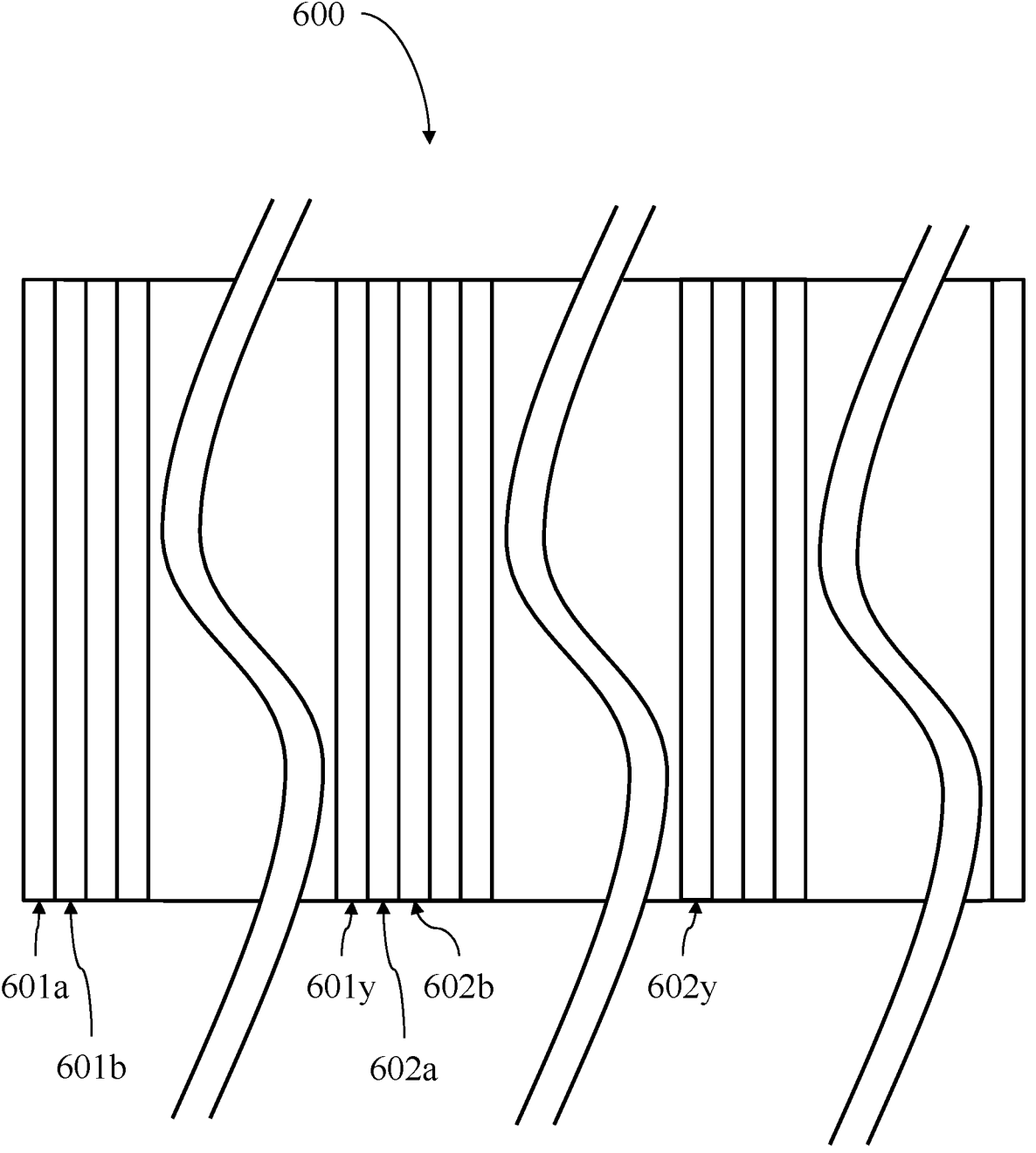
FIG. 5 is a schematic view of displaying image screens through pixel lines of a 3D display device, according to an application of the present invention.

Please refer to FIG. 5, which is a schematic view of displaying image screen through pixel lines of a 3D display device, according to an application of the present invention. In this example, the 3D display device 125 is a digital frame providing 25 viewing angles, the multi-source image includes pieces of image data which are time-synchronized and have 25 different capturing angles, respectively, the image screens of pieces of image data in the multi-source image are arranged at the pixel blocks of the frame of the multi-source image in an order of locations or capturing angles with respect to a shooting target. In the frame 500 shown in FIG. 4B, the image screen in the pixel block 511 is captured by the leftmost or rightmost image capture device with respect to the shooting target, the pixel block, and other pixel blocks in the order from left to right and from up to down include the frames of the pieces of image data generated by other image capture devices, in sequential order. After the companion robot 120 activates the 3D display device 125, the microcontroller 124 reads the image screens of the pieces of image data starting from the pixel block 511 of each frame 500 of the multi-source image, and output the image screens to the 3D display device 125.

In a condition that the 3D display device 125 includes the pixel lines as shown in FIG. 5, when the multi-source image includes 25 pieces of image data (that is, M=25), the first pixel information of the image screen at a first viewing angle (that is, the image screen is generated by the first image capture device) is displayed at a first pixel line 601*a*, the first pixel information of the image screen at a second viewing angle (that is, the image screen is generated by the second image capture device) is displayed at a second pixel line 601*b*, and so on, and the first pixel information of the image screen at a 25th viewing angle (that is, the image screen is generated by the 25th image capture device) is displayed at a 25th pixel line 601*y*, the second pixel information of the image screen at the first viewing angle (that is, the image screen is generated by the first image capture device) is displayed at a 26th pixel line 602*a*, the second pixel information of the image screen at the second viewing angle (that is, the image screen is generated by the second image capture device) is displayed at a 27th pixel line 602*b*, and an so on, the second pixel information of the image screen at the 25th viewing angle (that is, the image screen is generated by the 25th image capture device) is displayed at a 50th pixel line 602*y*, and all pixel information with all viewing angles are displayed based on the above-mentioned rule. In actual implementation, the 3D display device 125 includes a transmissive display unit 600, as shown in FIG. 5, the transmissive display unit 600 displays the image screen of the image data on i pixel lines, which are spaced by 24 pixel lines (that is, M−1 pixel lines, 25−1=24), wherein a value of i depends on a resolution of the image screen. For example, the image screen of first image data are displayed on the first pixel line 601*a*, the 26th pixel line 602*a*, . . . and so on; the image screen of the second image data are displayed on the second pixel line 601*b*, the 27th pixel line 602*b* and so on; the image screens of the 3rd to the 25th pieces of image data are displayed based on the above-mentioned rule.

In this way, the image screen of the first piece of image data (that is, the image data captured by the image capture device 411) displayed on the first pixel line 601*a*, the 26th pixel line 602*a* . . . of the transmissive display unit 600 of the 3D display device 125 can be viewed at the most-right viewing angle (that is, the viewing angle of the image capture device 411 capturing the image data); the image screen of the second piece of image data (that is, the image data captured by the image capture device 412) displayed on the second pixel line 601*b*, the 27th pixel line 602*b*, . . . of the transmissive display unit 600 of the 3D display device 125 can be viewed at the second-one-from-right viewing angle, and an so on; the image screen of the 25th piece of image data (that is, the image data captured by the image capture device 425) displayed on the 25th pixel line 601*y*, the 50th pixel line 602*y*, . . . of the transmissive display unit 600 of the 3D display device 125 can be viewed at the most-left viewing angle (that is, the viewing angle of the image capture device 425 capturing the image data). Therefore, the three-dimensional display of multi-source image can be achieved without affecting the clarity; in addition, the 3D display device 125 can display static images, and dynamic images such as videos, animations, streaming images.

According to above-mentioned contents, the difference between the present invention and the conventional technology is that, in the present invention, the companion robot continuously senses the user behavior status and the input speech, converts the input speech to the text, transmits the text and the user behavior status to the finite state machines of the server-end host to perform parsing and transitions, so that the server-end host generates the chat message having the emotion label, transmits the chat message to the artificial intelligence device, receives and stores the companion conversation message to the companion conversation list; the companion robot can select at least one companion conversation message from the companion conversation list as the output message, and convert the output message to speech which is broadcasted by a speaker; while broadcasting the output message, the companion robot continuously obtains M pieces of image data from the multi-source image and outputs the M pieces of image data to the 3D display device for three-dimensional display. Therefore, the above-mentioned technical solution of the present invention is able to solve the conventional problem, so as to achieve the technical effect of improving a companion effect of the companion robot.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A system for companion robot with three-dimensional (3D) display, comprising:

an artificial intelligence device, configured to receive a chat message having an emotion label through an application programming interface, input the chat message to a large language model, to generate at least one companion conversation message, and transmit the companion conversation message through the application programming interface;

a companion robot, comprising:

at least one sensor, configured to continuously sense at least one of physiological statuses, facial expressions, and body movements to generate a user behavior status, sense an input speech, generate an input message through a speech-to-text technology, and transmit the user behavior status and the input message corresponding to the user behavior status;

a speaker, configured to broadcast an output speech;

a storage device, configured to store a multi-source image and control instructions, wherein the multi-source image comprises frames, and M pieces of image data which have different capture angles and are time-synchronized, each of the frames comprises M pixel blocks, each of the pixel blocks comprises an image screen, and in each of the frames, the image screens in the pixel blocks arranged at the same position are the image screens of the same piece of image data at different time points, wherein M is a positive integer;

a microcontroller, electrically connected to the speaker and the storage device, and configured to execute the control instructions, make the microcontroller receive an output message, convert the output message to the output speech through a text-to-speech technology, continuously read the image screens in the pixel blocks of each of the frames of the multi-source image to obtain the M pieces of image data, and output the M pieces of image data; and a 3D display device, electrically connected to the microcontroller, and comprising pixel lines configured to display the different pieces of image data, respectively, wherein the pixel lines displaying different pieces of image data have different viewing angles, and a relative position of viewing angle to display one of the pieces of image data is the same as a relative position of a capturing angle of the one of the pieces of image data; and a server-end host, connected to the artificial intelligence device and the companion robot, and comprising:

a finite state machine controller, configured to integrate finite state machines;

a non-transitory computer-readable storage medium, configured to store computer readable instructions; and a hardware processor, electrically connected to the non-transitory computer-readable storage medium and the finite state machine controller, and configured to execute the computer readable instruction, make the server-end host execute:

inputting the user behavior status and the corresponding input message which are received from the companion robot, to the finite state machine controller, to perform a parsing process and transitions of states of the finite state machines to generate the chat message having the emotion label, transmit the generated chat message to the artificial intelligence device, receive the companion conversation message from the artificial intelligence device, and store the companion conversation message to a companion conversation list; and permitting the companion robot to automatically select and load at least one of the companion conversation messages from the companion conversation list as the output message.

2. The system for companion robot with three-dimensional (3D) display according to claim 1, wherein the multi-source image is generated through an algorithm calculation based on metadata and generative art, and the metadata comprises uniform resource identifier (URI) corresponding to the image data.

3. The system for companion robot with three-dimensional (3D) display according to claim 1, wherein the server-end host comprises a simulation model, the simulation model is trained with tone training data having relatives' tone features in advance, after the companion conversation list is stored completely, the server-end host loads the companion conversation messages from the companion conversation list and inputs the loaded companion conversation messages to the simulation model to generate the companion conversation message having the relatives' tone features.

4. The system for companion robot with three-dimensional (3D) display according to claim 3, wherein the simulation model is trained with at least one of image training data having relatives' motion features and speech training data having relative's speech features in advance, and at least one of the M pieces of image data and the output speech converted by the microcontroller is loaded from the storage device and inputted to the simulation model, to generate at least one of the M pieces of image data having the relatives' motion features and the output speech having the relative's speech features.

5. The system for companion robot with three-dimensional (3D) display according to claim 1, wherein the 3D display device comprises:

a transmissive display unit comprising pixel lines, wherein i pixel lines, which are spaced by M−1 pixel lines respectively, display the image screen of the n-th piece of image data outputted from the microcontroller, wherein each of i and n is a positive integer and 1≤n≤M; and a polarization control unit, comprising polarizing components, wherein the polarization control unit controls the polarizing components to form parallax barriers, the image screen of the n-th piece of image data displayed on the i pixel lines, which are spaced by M−1 pixel lines respectively, is viewed at a corresponding viewing angle.

6. A method for companion robot with three-dimensional (3D) display, comprising:

connecting a server-end host to an artificial intelligence device and a companion robot, wherein the server-end host comprises a finite state machine controller, a non-transitory computer-readable storage medium, and a hardware processor, the artificial intelligence device comprises an application programming interface, the companion robot comprises at least one sensor, a speaker, a storage device, a microcontroller, and a 3D display device, and the 3D display device comprises pixel lines;

storing a multi-source image and control instructions in the storage device, wherein the multi-source image comprises frames, M pieces of image data which have different capture angles and are time-synchronized, each of the frames comprises M pixel blocks, each of the M pixel blocks comprises an image screen, and in each of the frames, the image screens in the pixel blocks arranged at the same position are image screens of the same piece of image data at different time points, wherein M is a positive integer;

using the at least one sensor of the companion robot to continuously sense at least one of physiological statuses, facial expressions and body movements of a user to generate a user behavior status, sensing an input speech and converting the input speech to generate an input message through a speech-to-text technology, and transmitting the user behavior status and the input message to the server-end host;

inputting the user behavior status and the input message from the companion robot to the finite state machine controller, which integrates multiple finite state machines, to perform a parsing process and transition of states of the multiple finite state machines to generate a chat message having an emotion label, and transmitting the chat message to the artificial intelligence device through the application programming interface, by the server-end host;

inputting the chat message to a large language model to generate at least one companion conversation message, and transmitting the at least one the companion conversation message to the server-end host through the application programming interface, by the artificial intelligence device;

receiving the companion conversation message from the artificial intelligence device and storing the received companion conversation message to a companion conversation list, after the companion conversation list is stored completely, permitting the companion robot to automatically select and load at least one of the companion conversation messages from the companion conversation list as the output message, by the server-end host, and converting the loaded output message to an output speech through a text-to-speech technology and broadcasting the output speech through the speaker, by the microcontroller;

while the output speech is broadcasted, continuously reading the image screens of the pixel blocks in each of the frames to obtain the M pieces of image data from the multi-source image stored in the storage device, and outputting the image screens to the 3D display device, by the companion robot; and displaying the M pieces of image data, by the 3D display device, wherein the pixel lines displaying different pieces of image data have different viewing angles, and a relative position of a viewing angle to display one of the pieces of image data is the same as a relative position of a capturing angle of the one of the pieces of image data.

7. The method for companion robot with three-dimensional (3D) display according to claim 6, wherein the multi-source image is generated through an algorithm calculation based on metadata and generative art, and the metadata comprises uniform resource identifier (URI) corresponding to the image data.

8. The method for companion robot with three-dimensional (3D) display according to claim 6, wherein the server-end host comprises a simulation model, the simulation model is trained with tone training data having relatives' tone features in advance, after the companion conversation list is stored completely, the server-end host loads the companion conversation messages from the companion conversation list and inputs the loaded companion conversation messages to the simulation model to generate the companion conversation message having the relatives' tone features.

9. The method for companion robot with three-dimensional (3D) display according to claim 8, wherein the simulation model is trained with at least one of image training data having relatives' motion features and speech training data having relative's speech features in advance, and at least one of the M pieces of image data and the output speech converted by the microcontroller is loaded from the storage device and inputted to the simulation model, to generate at least one of the M pieces of image data having the relatives' motion features and the output speech having the relative's speech features.

10. The method for companion robot with three-dimensional (3D) display according to claim 6, wherein the 3D display device comprises:

a transmissive display unit comprising pixel lines, wherein i pixel lines, which are spaced by M−1 pixel lines respectively, display the image screen of the n-th piece of image data outputted from the microcontroller, wherein each of i and n is a positive integer and 1≤n≤M; and a polarization control unit, comprising polarizing components, wherein the polarization control unit controls the polarizing components to form parallax barriers, the image screen of the n-th piece of image data displayed on the i pixel lines, which are spaced by M−1 pixel lines respectively, is viewed at a corresponding viewing angle.

* * * * *